(No Model.)
W. E. BUTLER.
EVAPORATOR FOR CANE JUICES.
No. 318,866. Patented May 26, 1885.
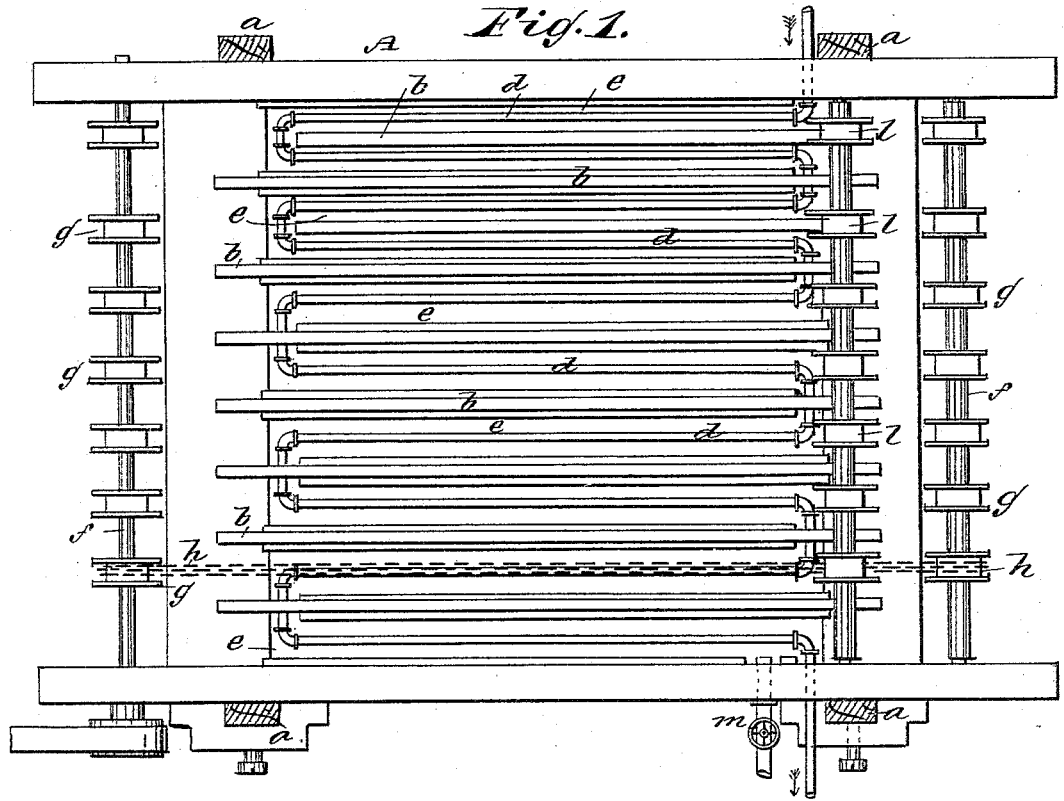
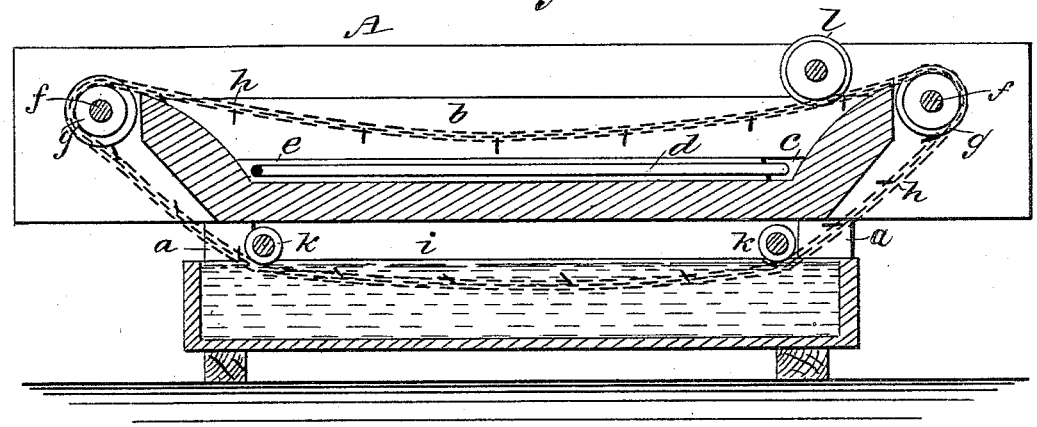
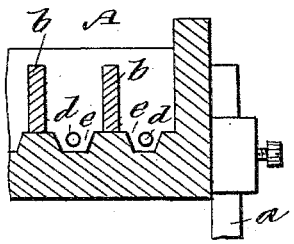
WITNESSES:
INVENTOR:
W. E. Butler
BY Munn & Co
ATTORNEYS.

UNITED STATES PATENT OFFICE.

WILLIAM E. BUTLER, OF NEWBERN, TENNESSEE.

EVAPORATOR FOR CANE-JUICES.

SPECIFICATION forming part of Letters Patent No. 318,866, dated May 26, 1885.

Application filed July 18, 1884. (No model.)

*To all whom it may concern:*

Be it known that I, WILLIAM E. BUTLER, of Newbern, in the county of Dyer and State of Tennessee, have invented a new and Improved Evaporator for Cane-Juices, of which the following is a full, clear, and exact description.

The object of my improvements is to accomplish the whole work of reduction in one evaporating-pan, so that the juice can be run from the mill, passed through the evaporator, and then discharged direct to the striking-pans. A further object is to lessen the labor of removing the scum; and to these ends my invention consists in the novel features of construction and in the mechanical skimmers hereinafter described and claimed.

Reference is to be had to the accompanying drawings, forming part of this specification, in which similar letters of reference indicate corresponding parts in all the figures.

Figure 1 is a plan view of the pan with most of the skimmers removed. Fig. 2 is a vertical longitudinal section, and Fig. 3 is a partial cross-section, of the pan.

The pan A may be of any suitable length and width, and is supported on legs $a$, which at one side of the pan are adjustable in length, so as to regulate the flow of the liquid by changing the level of the pan-bottom.

The pan is divided by longitudinal partitions $b$ into narrow spaces for containing the juice, the only communication between these spaces being by apertures $c$ at the ends of the partitions and at the bottom of the pan. The first two spaces formed by partitions $b$ at the side of the pan where the liquid first enters are wider than the other spaces, so as to give room for two lines of steam heating-pipes $d$, while the remaining spaces contain but a single line of pipe.

The steam-pipes $d$ are sunk in grooves $e$, formed in the pan-bottom, space being left below the pipes for the juice to pass. The pipes run back and forth in the spaces, and the ends are connected by elbows and short sections of pipe that extend through the apertures $c$, which connect the grooves $e$, so as to form a continuous passage.

In suitable bearings at the ends of pan A there are cross-shafts $ff$, provided with chain-wheels $g$, that carry endless chains $h$. There is one chain for each of the longitudinal spaces formed by partitions $b$, through which the upper sides of the chains pass, except at the last space, which will have no chain. The lower sides of the chains go beneath the pan into a water-tank, $i$. One shaft is to be rotated by power, so as to move the chains, and they thus act as skimmers to take up and carry away the scum, and by passing through the water-tank the chains are washed clean. The chains carry skimmers of suitable form.

$k\ k$ are rollers for holding the chains down into the water. $l$ is a roller above one end of the pan, for keeping the chains down to the level of the liquid. $m$ is the discharge-pipe for the liquid.

In operating the pan the juice is led into the first or wider space, and may be boiled therein, if necessary. The juice follows grooves $e$, and passes to the other spaces in succession, becoming denser in each space until it reaches the last, where it is discharged. The apertures $c$ connecting the spaces being at the bottom, the scum raised in each space is retained therein until removed by the skimmer.

With pans as usually made the liquid cannot be boiled until the steam-pipe is half covered. This is also the case in the pan made as above; but as the steam-pipes lie in the grooves a smaller quantity of liquid than heretofore can be boiled as it passes in the grooves, thereby greatly facilitating the cooking of the cane-juice.

The steam-pipe will have a valve for regulating the amount of steam.

Having thus described my invention, what I claim as new, and desire to secure by Letters Patent, is—

1. In an evaporator for cane-juices, the pan having between its partitions grooves arranged below the bottom edges of said partitions, and the pipes disposed in said grooves, substantially as and for the purpose set forth.

2. The combination, with pan A and skimming-chains $h$, of the water-tank $i$, substantially as and for the purpose specified.

WILLIAM E. BUTLER.

Witnesses:
I. R. DAYTON,
J. D. WESSON.